2,996,562
Patented Aug. 15, 1961

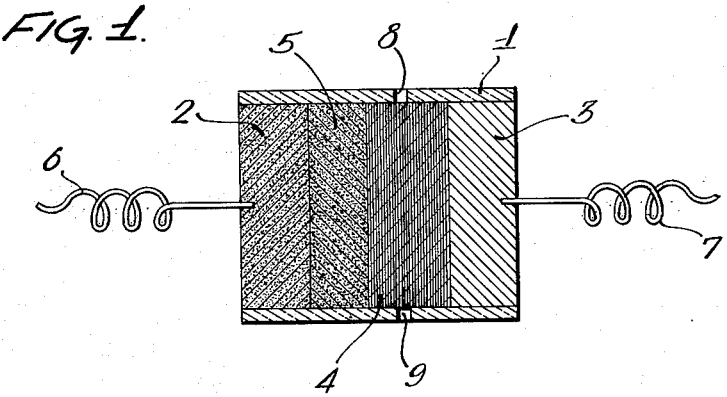
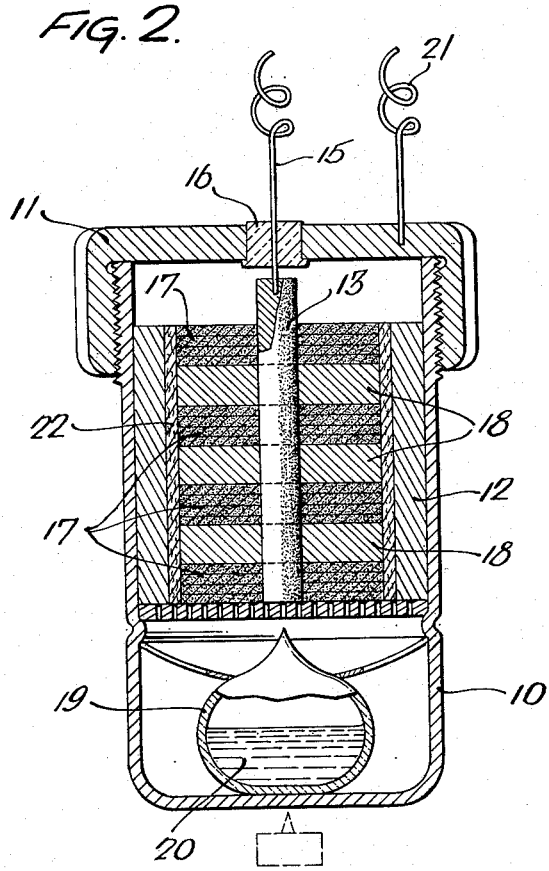
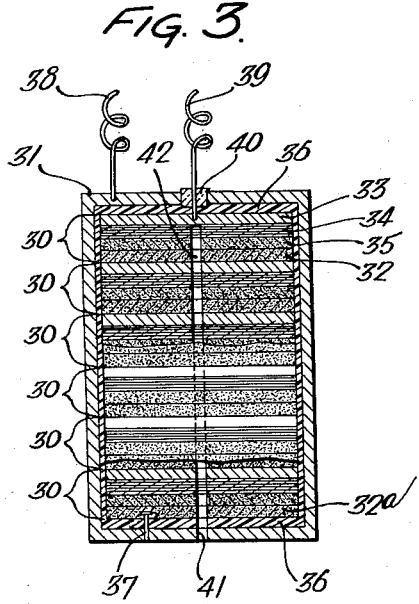

2,996,562
ELECTRIC-CURRENT PRODUCING CELL AND GENERATION OF CURRENT WITH SAME
William F. Meyers, Bluebell, Pa., assignor to G. & W. H. Corson, Incorporated, Plymouth Meeting, Pa., a corporation of Delaware
Filed Apr. 17, 1959, Ser. No. 807,057
16 Claims. (Cl. 136—6)

The present invention relates to a novel electric current-producing cell, and to a novel method of generating electric current using the same; and, more particularly, the invention relates to an improved electric current-producing cell system embodying an electrolyte in which the principal solvent is liquid ammonia instead of water as is the case in conventional electric current-producing cells. The invention also relates to a battery comprising two or more of such simple cells.

The electric current-producing cells and batteries in general use for years down to the present day utilize an aqueous solution of some acid, base or salt as an electrolyte. These cells and batteries perform under standard conditions of atmospheric pressure and temperature, and most of them can be stored for reasonable periods of time without deterioration. The effect of increasing the temperature in storage tends, in general, to reduce the shelf life of these cells and batteries. Reduction in temperature below freezing causes them to become inoperative. The chief reason for this inoperative characteristic of conventional cells and batteries at low temperatures is the electrolyte employed. While the introduction of certain solutes can be used to lower the freezing point of the aqueous electrolyte, it is still impossible to obtain good cell characteristics in these cells at temperatures very much below the freezing point of water. In the case where temperatures greatly below the freezing point of water are encountered, the conventional aqueous type cell will not operate. The conventional aqueous cell systems, therefore, possess limitations which render them unsatisfactory for operation at low temperatures as encountered for example, in arctic regions or at high altitudes.

Because of the limitations of aqueous cell systems there have been attempts to prepare cell systems in which the principal solvent for the electrolyte has been one or another organic liquid, such as pyridine, methane amide, methyl acetate, methanol, and the like. However, any advantage gained through the use of such liquids has been small relative to the limitations and the disadvantages encountered, and these systems have never achieved any commercial success.

In copending applications Serial No. 317,136, filed October 27, 1952 (now Patent No. 2,863,933), and Serial No. 546,364 (now Patent 2,937,219), filed November 14, 1955, are disclosed and claimed cell systems in which the electrolyte solvent is liquid ammonia. In the cell system of application Serial No. 317,136 the anode comprises an electropositive metal, the anolyte comprises a salt dissolved in the liquid ammonia, the cation of which corresponds to the electropositive metal of the anode, and the catholyte comprises an ammonium and/or metal salt dissolved in the liquid ammonia the metal cation of which develops and electrolytic potential in liquid ammonia at least 0.75 volt less than that developed by the metal of the anode in liquid ammonia.

The cell system of application Serial No. 546,364 comprises an anode, a depolarizing cathode and an electrolyte comprising liquid ammonia having material dissolved and ionized therein to render it electrically conductive, at least the anolyte portion of which comprises ammonium ions.

In copending application Serial No. 658,311, filed May 10, 1957, are disclosed and claimed a vapor-activatable cell comprising a cell compartment and, within the cell compartment, an anode, a cathode and a component of the electrolyte by itself substantially inactive to generate current with said anode and cathode, and means for introducing remaining component of electrolyte in the vapor state to the compartment for contact with the first-mentioned component to form active electrolyte. In the preferred embodiment the component of the electrolyte introduced in the vapor state is ammonia which is the solvent in the resulting electrolyte system.

It is the principal object of the present invention to provide a novel electric current-producing cell of the ammonia system in which the electrolyte solvent is liquid ammonia.

A further object of the invention is to provide an improved electric current-producing cell system of the ammonia type as disclosed and claimed in the foregoing copending applications.

Still another object of the invention is to provide an improved electric current-producing cell of the ammonia system which possesses greater activity and/or capacity than heretofore.

Still another object of the invention is to provide a novel method of generating electric current by chemical means with the ammonia system.

Other objects, including the provision of a novel electric current-producing battery possessing the herein-mentioned features, will become apparent from a consideration of the following specification and claims.

Before discussing the present cell in detail, it will be helpful to consider the nature of liquid ammonia and of the liquid ammonia system. Under ordinary atmospheric conditions ammonia is a colorless gas. Upon cooling, however, under one atmosphere pressure, this gas can be converted to a liquid at about $-33°$ C. Liquid ammonia freezes at about $-77°$ C. Theoretically, liquid ammonia ionizes mainly into the ammonium ($NH_4^+$) ion and amide ($NH_2^-$), imide ($NH^=$) and nitride ($N^{\equiv}$) ions, the ammonium ions corresponding to the hydrogen ions of the aqueous system and the amide, imide and nitride ions corresponding to the hydroxyl ions of the aqueous system. However, as a practical matter, liquid ammonia does not ionize measurably. Under present day chemical terminology, the names of classes of inorganic compounds are based on the aqueous system. In other words, ammonium hydroxide is normally considered to be a base while ammonium compounds produced, for example, by the neutralization of ammonium hydroxide with an acid, are normally considered to be salts. It will be seen that in the liquid ammonia system, conventional terminology may be misleading in that, in the liquid ammonia system, ammonium compounds provide ammonium ions and hence ammonium hydroxide is actually a weak acid with respect to liquid ammonia, and ammonium salts, such as ammonium thiocyanate, are actually strong acids. Water, since it forms ammonium ions in the liquid ammonia system, functions as a weak acid. The addition of water to liquid ammonia is similar to adding ammonium hydroxide. By the same token the addition of an acid (HA) results in the formation of ammonium ions and hence produces acidity ($NH_4A$) in the liquid ammonia system. The bases in the liquid ammonia system, the amides, imides and nitrides, are in general insufficiently soluble for practical electrolyte compositions. There are many analogies between the function of ordinary metal salts in liquid ammonia and their functions in water. It will be seen, however, that in electrolytes wherein liquid ammonia is the principal solvent, "acidity" or "neutrality" may be controlled by the addition of ammonium compounds, water or acid, on the one hand, or of amides, etc. on the other. Herein, reference is made to ammonium compounds, that is hydroxide or salts, in accordance with conventional terminology in spite of the fact that, in the liquid ammonia system, they are the acids.

Liquid ammonia by itself is not sufficiently conductive to serve as an electrolyte in an electric current-producing cell. As in the case of water in the aqueous cell systems, material freely ionizable in the solvent, ammonia, must be dissolved in the liquid ammonia in order to render it sufficiently conductive.

As in aqueous cell systems, polarization of the cathode presents problems in ammonia cell systems. By "polarization" is meant the formation, at the cathode, of hydrogen or other reaction products which tend to raise the cathode potential and/or produce loss of contact between the cathode conductor and the electrolyte. The prevention of this phenomenon is termed "depolarization." Depolarization can be accomplished by physical means, based on the ability of hydrogen to diffuse through solid materials, or by chemical means through the use of a material, in contact with the cathode conductor, which reacts with polarizing products thereby preventing or minimizing their formation. The material most often used heretofore for this purpose in ammonia cell systems has been manganese dioxide. With manganese dioxide and other depolarizing materials heretofore used there are limitations due to effects thereon of acids or solutes in the electrolyte.

It has been found that elemental sulfur serves as an excellent depolarizer in the ammonia cell system and is devoid of the above-mentioned limitations. Sulfur may be employed as the sole depolarizer or may be used in conjunction with other depolarizing materials. It has also been found that the sulfur may also serve as electrolyte solute imparting electrical conductivity to the liquid ammonia so that it can serve as the sole electrolyte solute or may be used in conjunction with other solutes in the liquid ammonia system. When serving as solute it does not produce the acid and solute limitations occasioned with other solutes on prior depolarizing materials. The improvement through the use of sulfur in accordance with the present invention manifests itself largely through greater capacity for the cell. Sulfur is, of course, an inexpensive and non-critical material, particularly as compared to prior depolarizing materials like manganese dioxide, silver perioxide, lead dioxide and silver chloride. Furthermore, in the present cell the anode metal and the sulfur are the capacity-limiting constituents of the cell. This is most desirable since, in general, the capacity of cells is limited by the quantity of electrolyte which can be held by the cell.

Sulfur reacts with liquid ammonia to provide dinitrogen pentasulfide, $N_2S_5$, tetranitrogen tetrasulfide, $N_4S_4$, and ammonium sulfide, $(NH_4)_2S$. The latter imparts conductivity to the ammonia. These products and their formation will be discussed more in detail hereinafter in connection with the theory of depolarization in connection with the present invention.

The improvement of the present invention, therefore, comprises, in the ammonia electric current-producing cell system involving an anode, a cathode and electrolyte in which liquid ammonia is the solvent, sulfur in contact with the cathode.

The cell as prepared and marketed may or may not contain the liquid ammonia already in association with the anode, cathode and sulfur. When the cell contains the ammonia it comprises the anode, cathode and electrolyte comprising liquid ammonia, the ammonia in contact with the cathode having sulfur reacted therewith, and requires but the completion of the circuit to generate current. In this case, the liquid ammonia in contact with the cathode (the catholyte) will comprise ammonium sulfide. In accordance with the preferred embodiment, however, the cell device is marketed without the ammonia, being activatable upon the admission of ammonia to the cell compartment, and in this case the cell device comprises a cell compartment and, within said compartment, an anode, a cathode and elemental sulfur adjacent the cathode so that mixing and reaction of the admitted ammonia with the sulfur forms a product wetting the cathode, and means for introducing ammonia, preferably in the vapor state, to said anode, cathode and sulfur.

For illustration of cells of the present invention reference may be had to the drawings in which:

FIGURE 1 represents, schematically, a side elevational, sectional view of one form of cell of the present invention;

FIGURE 2 represents, schematically, a side elevational, sectional view of another form of cell of the present invention, and FIGURE 3 illustrates schematically, a side elevational view, partly in section, a form of battery of the invention comprising a plurality of the present cells in a single compartment.

Referring to the electrolyte, as stated, sulfur may be the sole solute for the electrolyte in which case the electrolyte is liquid ammonia containing ammonium sulfide through the sulfur reacted therein. Most often the sulfur is confined to the cathode section, and, when sulfur is the sole solute for the catholyte, the catholyte will be liquid ammonia containing ammonium sulfide. However, benefits of the present invention may also be realized when other solute is used in conjunction with the sulfur. In general, the more "acid" the liquid ammonia electrolyte, the higher the conductivity. As stated, ammonium hydroxide and ammonium salts are "acids" in the liquid ammonia system. Hence, any ammonium salt soluble in liquid ammonia at least to the extent hereinafter discussed or any compound which forms with the ammonia either ammonium hydroxide or an ammonium salt in solution therein to a concentration hereinafter discussed, may be employed as part of the solute along with the sulfur. Of the ammonium salts, ammonium thiocyanate and ammonium perchlorate are particularly advantageous. These salts are freely soluble in liquid ammonia. Other salts that may be mentioned as being applicable are the cyanides, chlorides, cyanates, fluoborates, iodides, nitrates, nitrites, and the like. A metal salt or salts may be employed, and when the cation is a metal, it will generally be a metal above iron in the electro-chemical series, particularly lithium, sodium, potassium, caesium, rubidium, calcium, strontium, barium, magnesium, zinc, aluminum, beryllium, manganese, and the like. Salts or the alkali and alkaline earth metals, especially salts of lithium, calcium and magnesium, and zinc salts are particularly preferred. Of all the salts, the ammonium salts and the lithium salts have been found to be particularly advantageous.

The acidity that can be tolerated in any particular cell system may be limited by the nature of the other components of the cell, particularly the anode. As will be pointed out more in detail hereinafter, in some situations care must be exercised in controlling the acidity of the electrolyte to avoid undue local action at the anode. Hence, the requisite conductivity of the electrolyte may be provided in part by metal salts, which, in the ammonia system, are more or less neutral.

At any rate, the ammonium ion concentration at the anode upon dissolution of the solute in the ammonia should be such as to produce an ammonium electrode potential not substantially less than the anode potential. The exact difference between the ammonium electrode potential and the anode potential will depend primarily upon the characteristics desired in the cell as determined by the proposed application. For example, if it is desired that the cell possess a long shelf life after activation, the difference between the two potentials will normally be less than in the case of a cell in which a short useful life after activation is required. The greater the ammonium electrode potential is below the anode potential, the greater the tendency for deterioration, by chemical action, of the anode.

Since, the anode may favor one set of conditions, e.g. low acidity, and the cathode may favor another set of conditions, e.g. high acidity, the solute employed may often be a compromise between these two extreme considerations. On the other hand, the cell compartment may actually be divided into two separate sections namely, an anode section and a cathode section, with differing solutes in each, the two sections being separated by a porous or permeable diaphragm. In such case, separate electrolyte portions will be formed, namely, an anolyte and a catholyte.

There are other factors which also determine the amount of solute dissolved in the liquid ammonia to provide the electrolyte. One of the primary considerations in this connection is the temperature under which the cell is designed to operate. In general, the conductivity of the electrolyte decreases with decreasing temperature. For any given solute at any particular temperature, there is an optimum concentration of solute to provide optimum conductivity. Below and above this optimum concentration, the conductivity falls off. In other words, by plotting conductivity versus concentration of solute at any given temperature, there results a curve which starts out at the low side of conductivity, ascends to one or more peaks and then drops off again. Thus, if the cell is to operate at an exceedingly low temperature, and it is desired to provide maximum conductivity at that temperature, the concentration of solute must be controlled. When the cell is to operate at higher temperatures, such as high atmospheric temperatures or above, it is often desirable to incorporate sufficient solute to raise the boiling point of the electrolyte to above the temperature conditions to which the cell is to be subjected to avoid the use of pressure. Again, when the cell is to operate at exceedingly low temperatures, it will be necessary that the electrolyte remain as a liquid at that operating temperature. For example, with certain molar proportions of ammonium thiocyanate, ammoniated ammonium thiocyanate freezes out. Thus, when operating at these temperatures, the amount of solute employed should be substantially less than that providing, with the ammonia, the ammoniated compound which freezes out at those temperatures. For example, $NH_4SCN \cdot NH_3$ freezes out at about $-20°$ to $-40°$ C., so that a cell designed to operate at this temperature should not have, as its entire electrolyte, a mixture of ammonium thiocyanate and ammonia in a 1:1 molar ratio.

Another factor to be taken into consideration in determining the amount of solute dissolved in the ammonia solvent is the effect of that concentration on the operation of the electrodes. For example, with some anode materials, such as zinc, the anode product, for instance zinc thiocyanate, may precipitate out in the electrolyte at high discharge rates and low temperatures if too much solute is dissolved at the anode region. When such a solid product is formed at the anode region, the anode becomes blocked increasing the internal resistance of the cell, and, in many cases, the anode potential is reduced. Similar consideration is applied to the cathode; however, the nature of the cathode material and/or type of solute will frequently result in different ranges of concentration requirements.

The above-mentioned considerations being borne in mind, the amount of solute, including sulfur, actually employed may range up to the limits of its solubility in the liquid ammonia at the temperature under consideration. The amount of solute may actually exceed the limits of its solubility in the liquid ammonia. Thus, aside from the questions of optimum conductivity, and of the freezing out of solvated compounds as discussed above, it is not material that excess solute be present.

In order to provide significant current capacity in the cell, it has been found necessary to provide a concentration of solute in the liquid ammonia of at least 1 mol percent. Particularly advantageous results are obtained when the concentration is at least about 2 mol percent. These figures refer to ammonium sulfide plus any other solute employed in conjunction with the sulfur. As to the upper concentration limits for the solute, it is obviously impossible to set a specific figure and say that the compositions on one side are all operable for any purpose and those on the other side are not, since much depends upon the particular solute selected, the nature of the anode and of the cathode, the operating characteristics desired, the temperature and pressure conditions under which the cell is to be operated, and the like, all of which factors must likewise be taken into consideration in conventional aqueous current-producing cell systems. However, as stated above, the amount of solute employed may even exceed its solubility in the ammonia.

The foregoing discussion has dealt with the solute broadly and no distinction has been made between the situation where the electrolyte to be formed is uniform throughout and the situation where the electrolyte is formed into the components—the anolyte and the catholyte—in which the anolyte and the catholyte differ as to composition. In certain instances it is desirable that the anolyte, that is the portion of the electrolyte adjacent the anode, and the catholyte, that is the portion of the electrolyte adjacent the cathode, differ from each other as to composition. In such case the solute adjacent the cathode in the cathode section of the cell may differ from the solute adjacent the anode in the anode section of the cell. Where the anolyte and catholyte are to differ, the anode section and the cathode section of the cell compartment may be separated from each other by means of a porous or permeable diaphragm. Even in this case, of course, the anode and the cathode will be in ionic flow relationship. In any event, in accordance with the present invention, sulfur will be present in the cathode section for contact with the cathode at least some of which will be in dissolved form when the cell contains liquid ammonia or which will be present as elemental sulfur when ammonia is to be added subsequently for activation of the cell.

In one form of cell system in which the anolyte and catholyte differ, the anode comprises an electro-positive metal of the type discussed below, and the solute adjacent the anode comprises a metal salt the cation of which is a metal corresponding to the electro-positive metal of the anode or a metal higher in the electromotive series than the electro-positive metal of the anode, that is, a metal of at least the same level in the electro-motive series as the electro-positive metal of the anode; and the solute adjacent the cathode comprises sulfur or sulfur and, in addition, an ammonium salt and/or a metal salt.

Referring to the electrodes, the anode generally comprises an electro-positive metal. Any metal above iron in the electro-chemical series, particularly lithium, sodium, potassium, caesium, rubidium, calcium, strontium, barium, magnesium, zinc, aluminum, beryllium, manganese, and the like, or mixtures thereof as well as alloys containing one or more of these metals, is suitable. Of the metals, the alkali and alkaline earth metals and zinc, especially lithium, calcium, magnesium, and zinc, particularly the first, are preferred.

The exact nature of the materials selected as anode will depend upon many factors, including the characteristics desired in the cell. The characteristics desired may dictate the type of electrolyte required, which, in turn, may determine which material should constitute the anode. For example, if high voltage is the criterion, a metal which is highly active, such as lithium, calcium, and the other alkali and alkaline earth metals and alloys containing them, may be selected for the anode. If a moderate voltage is desired, less active of the alkaline earth metals, such as magnesium, and other metals such as aluminum, manganese, zinc, and alloys containing them, may be selected.

Reference has been made above to the use, as anode, of alloys containing one or more of the metals listed. The alloying of the anode metal with another, less active metal, reduces the availability of the anode metal, and, hence, its chemical activity. Thus, by appropriate selection of alloys containing highly active anode metals alloyed with less active metals, it is possible to employ as anode an alloy containing a highly active metal in situations where the use of that metal by itself would be impractical. Examples of such alloys are lithium aluminum alloys, lithium amalgams, lithium zinc alloys, lithium magnesium alloys, lithium lead alloys, and the like.

The cathode may be made up of a conductive material that is inert to the electrolyte such as electrolytic carbon, platinum, boron, zirconium, tantalum, or the like. Of this group, carbon is the preferred material. However, in applications where carbon is mechanically unsuitable, a conducting protective film may be used to coat and protect a reactive metal cathode conductor.

As stated, another auxiliary depolarizer may be employed in conjunction with the sulfur in accordance with the present invention and such other depolarizer may be a compound of a metal that possesses a potential in liquid ammonia at least about 0.75 volt less than that provided by the anode metal in liquid ammonia. This metal compound may be soluble, partially soluble or insoluble in the catholyte. Metals, such as iron, manganese, nickel, copper, silver, lead, mercury, and the like, possess relatively low positive potentials or negative potentials. The metal compound employed in conjunction with sulfur at the cathode may, therefore, be of one of such metals so long as the algebraic difference between its potential in liquid ammonia and the potential of the anode metal in liquid ammonia is at least 0.75 volt. Examples of such metals in the form of compounds serving as depolarizers are manganese dioxide, lead oxide, lead dioxide, lead chloride, lead thiocyanate, silver oxide, silver peroxide, silver hydroxide, silver thiocyanate, silver chloride, mercury chloride, mercury thiocyanate, and the like.

The design or construction of the cell compartment of the present invention may vary widely depending upon the particular use intended for the cell. The cell may be constructed from a wide variety of relatively cheap and available materials, for example, iron, glass, ceramic material, rubber or synthetic rubber-like materials, synthetic resins, and the like. The material selected, of course, should be chemically resistant to liquid ammonia.

The electrodes may be of any desired shape, such as flat sheets, rods, rolls, cylinders, bobbins, discs, or the like.

As stated previously, sulfur reacts with liquid ammonia to form nitrogen sulfides and ammonium sulfide. The reduction of the sulfur, upon reaction with the liquid ammonia, to the sulfide form is believed to account for its function as a depolarizer in accordance with the present invention. The following discussion is set forth by way of a theoretical explanation of the mechanism of depolarization by means of sulfur in accordance with the present invention but is not intended to be limiting: It is believed that initially the sulfur forms the stated sulfides. In operation of the cell, the dinitrogen pentasulfide is first reduced to tetranitrogen tetrasulfide, and this reduction, as well as possibly some reduction to ammonium sulfide, exerts a first level of depolarizing effect which manifests itself as a first level or plateau when voltage is plotted against discharge. On exhaustion of the dinitrogen pentasulfide and continued operation of the cell reduction of the tetranitrogen tetrasulfide to ammonium sulfide exerts a depolarizing effect which manifests itself as a second, lower, level or plateau in such a plot.

The important feature, as far as the present invention is concerned, is to provide, in contact with the cathode at least by the time the cell is to operate, liquid ammonia containing sulfur reacted therein, that is liquid ammonia containing the stated sulfides. This can be accomplished in a wide variety of ways. For example, sulfur may initially be reacted with liquid ammonia, and the resulting solution fed to the cell or to the cathode section of the cell. On the other hand, elemental sulfur as such may be incorporated in the cell, generally in the cathode section and in contact with, or at least adjacent, the cathode, before admission of the ammonia. This is the procedure followed in accordance with the preferred embodiment wherein ammonia is introduced to the cell compartment, at the time of activation, in vapor form. The addition of the ammonia in this manner results in the ammonia condensing at the site of the solute, including the sulfur, and reacting with the sulfur and dissolving any other solute.

If it is desired to render the sulfur conductive, finely-divided conducting material, such as carbon, copper, and the like, may be incorporated in the sulfur. Such conducting material should be substantially insoluble in liquid ammonia.

The essential current generating reacting reactor of the present cell is

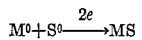

$$M^0 + S^0 \xrightarrow{2e} MS$$

where M is the electropositive metal of the anode. Hence, the present cell is "electrode-limited" that is to say, the current generating life of the cell is limited by the quantity of anode metal and sulfur available for reaction. Therefore, the amount of sulfur employed will be dictated largely by the size of the cell and its components and design considerations, all of which is well known to those skilled in the electric current-producing cell art where the same factors are encountered in other "electrode-limited" cell systems.

Referring then to the drawings, FIGURES 1 and 2, as stated, illustrate schematically cell systems embodying the present invention. The cell of FIGURE 1 comprises a cylindrical glass casing 1, a cathode 2 and an anode 3. Paper separators 4 may or may not be impregnated with a suitable electrolyte salt as described hereinabove. 5 represents a body of sulfur in contact with cathode 2, and this body of sulfur may consist of a mixture of finely-divided sulfur (flowers of sulfur) and finely-divided inert conducting material such as carbon (graphite). Cathode 2 and anode 3 are provided with suitable conducting wires 6 and 7, respectively. Ports 8 and 9 are provided in casing 1 through which ammonia is admitted, either in liquid form or as a vapor. Where the cell is to be activated through the admission of ammonia, the circuit is completed and ammonia in vapor form is injected through ports 8 and 9. The admitted ammonia condenses in contact with the sulfur reacting therewith and condenses in contact with any other solute present to dissolve the same thus forming the complete electrolyte and activating the cell. On the other hand, before completing the circuit, the ammonia may be admitted to form the electrolyte, the cell requiring only the completion of the circuit to produce current.

FIGURE 2 illustrates a self-contained, ammonia-vapor-activated unit in which the ammonia is located in a rupturable ampoule in contact with the cell compartment. In this case 10 represents the cell casing, which may be steel or other conductive material, provided with cap 11. 12 represents a magnesium casing serving as anode for the cell and 13 represents a carbon rod cathode. Attached to cathode 13 is conductor wire 15 insulated from cap 11 by ceramic sleeve 16. 17 represents porous, e.g. paper, separator discs, which may be impregnated with solute salt, and 18 represents sections of depolarizing material comprising sulfur, e.g. sulfur itself, or a mixture of sulfur and a finely-divided inert conducting material such as carbon. 19 is a frangible ampoule containing liquid ammonia 20. Conducting wire 21 is attached to cap 11 by which the circuit may be completed. 22 is a porous paper cylinder which may be impregnated with anolyte solute. In operation to activate the cell, ampoule 19 is broken as by pin percussion allowing the liquid ammonia to vaporize. The ammonia vapor permeates the cell including porous separators 17 condensing and dissolving any solute contained therein and also condenses at the site of the elemental surfur reacting with the same. The cell is thus activated, and the circuit may be completed to generate current.

FIGURE 3 illustrates a battery made up of a plurality of individual cells 30 in a single compartment. 31 represents the battery casing which may be of steel or other conducting material. Each cell 30 is made up of a cathode 32, an anode 33, porous, e.g. paper, separator discs 34, which may be impregnated with a solute salt, and a body 35 of depolarizing material comprising sulfur as previously described. The cells are insulated from casing 31 by means of an insulating layer 36 which may be of a suitable resin or polymer like polyethylene, although the cathode (32a) which is adjacent the bottom of casing 31 is connected electrically to the casing as by wire 37. Lead wire 38 is connected to casing 31, and lead wire is connected to the end anode 33 which is adjacent the top of casing 31, being insulated from casing 31 by insulating sleeve 40. Each of the components of each cell is in electrical contact with the adjacent members and each cell is in electrical contact with each adjacent cell. A port 41 is provided through casing 31 and insulating layer 36 through which ammonia may be admitted to central channel 42. Admission of ammonia through port 41 and into channel 42 results in ammonia permeating the sulfur body 35 and porous spacer 34 of each cell thereby activating the battery. Current is then generated by completion of the circuit through lead wires 38 and 39.

In the embodiment wherein the cell is activated through the admission of ammonia vapor, it is preferred that the cell compartment, before the addition of the ammonia, be free of moisture, and, preferably, also substantially free of air. Hence, in preparation of the cell in accordance with this embodiment, the cell compartment may be evacuated or flushed with a dry inert gas which is soluble in the ammonia, prior to sealing. The following examples illustrate the preparation and operation of thte improved cell system of the present invention, but are not intended to limit the scope of the invention in any way:

EXAMPLES I–X

Cell systems, generally similar to that illustrated in FIGURE 1 of the drawings, are prepared in which: the cell casing is a precision-bore pyrex tube ½ inch I.D.; the anode is a magnesium disc ½ inch in diameter weighing 77 milligrams; the cathode is a carbon disc ½ inch in diameter; and the depolarizer and paper separator pads are as set forth below. Variations in the systems are as follows:

I. One paper separator disc impregnated with 24 milligrams of ammonia thiocyanate and, as depolarizer, a mixture of 15 milligrams of flowers of sulfur and 185 milligrams of acetylene black.

II. Four paper separator discs of the kind used in Example I and depolarizer as in Example I.

III. Eight paper separator discs of the kind used in Example I, and depolarizer as in Example I.

IV. Four blank paper separator discs, i.e. containing no salt, and depolarizer as in Example I.

V. Four paper separator discs each of which is impregnated with 24 milligrams of magnesium thiocyanate, and depolarizer as in Example I.

VI. Four paper separator discs of the kind used in Example I, and, as depolarizer, a mixture of 30 milligrams of sulfur and 170 milligrams of carbon.

VII. Four paper separator discs of the kind used in Example I, and, as depolarizer, a mixture of 50 milligrams of sulfur and 150 milligrams of carbon.

VIII. Four paper separator discs of the kind used in Example I, and, as depolarizer, a mixture of 100 milligrams of sulfur and 100 milligrams of sulfur and 100 milligrams of carbon.

IX. Four paper separator discs of the kind used in Example I, and, as depolarizer, a mixture of 133 milligrams of sulfur and 67 milligrams of carbon.

X. Four paper separator discs each of which is impregnated with 24 milligrams of potassium thiocyanate, and depolarizer as in Example I.

In operating each cell, the cell is placed in a steel cylinder, with suitable attachment of the leads to a circuit containing measuring devices. The steel cylinder, and hence the cell, is evacuated to remove air and moisture. Anhydrous ammonia vapor is then injected with the steel cylinder flowing into the cell and activating the cell. Twenty minutes are allowed from the time the ammonia is first admitted and measurements are made. During operation of each cell voltage is measured, both under load (25 milliamperes with 50% duty cycle 33⅓ seconds long) and under no load, and plotted against coulombs output. The length of operation, in kiloseconds, and total coulombs output are recorded. In the plots of no-load voltage versus coulombs, inflection points are noted showing distinct and different levels or plateaus of potential during operation of the cell. The point in terms of coulombs output, and average no-load voltage at the plateau before these inflections occur are, in most cases, recorded. The results are set forth in the following tables.

Table A

| Example | | I | II | III | IV | V |
|---|---|---|---|---|---|---|
| Duration of run-kiloseconds | | 7.1 | 24.4 | 19.2 | 16.6 | 26.1 |
| Total coulombs (maximum) | | 89 | 305 | 240 | 208 | 326 |
| Cell voltage, under no-load (upper figure) and load (lower figure) at coulombs output in first column. | 0 | 2.05 / 1.56 | 2.18 / 1.94 | 2.17 / 1.97 | 2.11 / 1.76 | 2.10 / 1.26 |
| | 52 | 1.77 / 1.38 | 1.90 / 1.58 | 1.33 / 0.75 | 1.83 / 1.16 | 1.85 / 1.28 |
| | 104 | ------ | 1.54 / 0.76 | 1.30 / 0.66 | 1.29 / 0.23 | 1.35 / 0.59 |
| | 156 | ------ | 0.91 / 0.25 | 1.27 / 0.43 | 0.86 / −0.11 | 1.33 / 0.48 |
| | 208 | ------ | 0.63 / −0.20 | 0.83 / 0.05 | ------ | 1.06 / 0.16 |
| | 260 | ------ | 0.62 / −0.31 | ------ | ------ | 0.72 / −0.07 |
| | Max | ------ | 0.57 / −0.73 | 0.68 / −0.17 | ------ | 0.65 / −0.18 |
| Cell voltage (no load) inflection points: | | | | | | |
| First | coulombs | 10 | 20 | 12 | 21 | 17 |
| | voltage | 2.00 | 2.07 | 2.03 | 1.95 | 1.99 |
| Second | coulombs | 76 | 95 | 48 | 72 | 97 |
| | voltage | 1.25 | 1.70 | 1.60 | 1.47 | 1.50 |

Table B

| Example | | VI | VII | VIII | IX | X |
|---|---|---|---|---|---|---|
| Duration of run-kiloseconds | | 25.0 | 8.5 | 8.5 | 6.0 | 32.5 |
| Total Coulombs (maximum) | | 191 | 110 | 98 | 78 | 406 |
| Cell voltage, under no-load (upper figure) and load (lower figure) at coulombs output in first column. | 0 | 1.97 / 1.71 | 2.01 / 1.58 | 1.85 / 1.45 | 2.14 / 1.84 | 2.18 / 1.89 |
| | 52 | 1.88 / 1.47 | 1.89 / 1.50 | 2.04 / 1.36 | 2.06 / 1.55 | 1.62 / 1.18 |
| | 104 | 1.25 / 0.47 | 0.23 | | | 1.05 / 0.45 |
| | 156 | 0.80 / −0.50 | | | | 0.81 / 0.17 |
| | 208 | | | | | 0.74 / 0.03 |
| | 260 | | | | | 0.66 / −0.09 |
| | Max | 0.72 / −0.30 | | | | 0.47 / −0.70 |
| Cell voltage (no load) inflection points: | | | | | | |
| First | coulombs | | 76 | 60 | 60 | 32 |
| | voltage | | 0.99 | 1.60 | 1.90 | 1.82 |
| Second | coulombs | | | | 84 | 112 |
| | voltage | | | | 1.35 | 0.96 |

I claim:

1. In an ammonia electric current-producing cell system involving an anode, a cathode and electrolyte in which liquid ammonia is the solvent, the improvement comprising sulfur adjacent the cathode for reaction with the ammonia.

2. In an ammonia electric current-producing cell system involving an anode, a cathode and electrolyte in which liquid ammonia is the solvent, the improvement comprising nitrogen- and ammonium sulfides in contact with the cathode.

3. In an ammonia electric current-producing cell system involving an anode, a cathode and electrolyte in which liquid ammonia is the solvent, the improvement comprising liquid ammonia containing nitrogen sulfides and ammonium sulfide therein in contact with the cathode.

4. An electric current-producing cell comprising an anode comprising an electropositive metal and a cathode; an anolyte comprising a metal salt the cation of which is an electropositive metal dissolved in liquid ammonia, and a catholyte comprising nitrogen- and ammonium sulfides in liquid ammonia.

5. An electric current-producing cell comprising an anode, a cathode and an electrolyte comprising liquid ammonia having material dissolved therein to render it electrically conductive, at least the catholyte portion of which comprises nitrogen- and ammonium sulfides in liquid ammonia.

6. An ammonia vapor-activatable electric current-producing cell device comprising a cell compartment and, within said cell compartment, an anode, a cathode and elemental sulfur adjacent said cathode.

7. An ammonia vapor-activatable electric current-producing cell device comprising a cell compartment and, within said cell compartment an anode comprising an electropositive metal, a cathode, electrolyte solute free of any electrolyte solvent and comprising a salt the cation of which is selected from the group consisting of ammonium and electropositive metals and catholyte solute comprising elemental sulfur, and means for introducing ammonia in the vapor state to said compartment for contact with said solutes.

8. A vapor-activatable electrice current-producing cell device comprising a cell compartment and, within said cell compartment, an anode, a cathode and a conductive mixture of elemental sulfur and of finely-divided electrically conductive material in contact with said cathode, and means for introducing ammonia in the vapor state to said cell compartment for contact with said sulfur.

9. The device of claim 8 wherein said finely-divided conductive material mixed with said sulfur is carbon.

10. The method of generating electric current which comprises contacting an anode comprising an electropositive metal and a cathode with an electrolyte comprising nitrogen- and ammonium sulfides in liquid ammonia, and completing the circuit between the anode and cathode.

11. The method of generating electric current which comprises contacting an anode comprising an electropositive metal with an anolyte comprising salt dissolved in liquid ammonia the cation of which is selected from the group consisting of ammonium and electropositive metals; contacting a cathode with a catholyte comprising nitrogen- and ammonium-sulfides in liquid ammonia, said catholyte and anolyte being at least in ionic flow relationship, and completing the circuit between the anode and cathode.

12. The method of generating electric current which comprises contacting an anode and a cathode with an electrolyte comprising liquid ammonia having material dissolved and ionized therein to render it electrically conductive, at least the catholyte portion of which comprises nitrogen- and ammonium sulfides in liquid ammonia, and completing the circuit with an external load between the anode and cathode.

13. The method of generating electric current which comprises introducing to a cell compartment comprising an anode, a cathode and elemental sulfur free of any electrolyte solvent in contact with said cathode, ammonia in the vapor state, said ammonia condensing and reacting with said sulfur, the circuit with an external load between the anode and cathode being completed.

14. The method of claim 13 wherein there is also present in said cell compartment at least adjacent the anode a salt of an electropositive metal soluble in liquid ammonia.

15. An ammonia-activatable electric current-producing cell device comprising a cell compartment, and within said cell compartment an anode, a cathode and elemental sulfur adjacent said cathode, and means for introducing ammonia to said compartment for contact with the said sulfur.

16. The method of generating electric current which comprises introducing ammonia to a cell compartment comprising an anode, a cathode and elemental sulfur free of any electrolyte solvent in contact with said cathode, said ammonia reacting with said sulfur, the circuit with an external load between the anode and cathode being completed.

References Cited in the file of this patent

UNITED STATES PATENTS

| 1,771,190 | Polcich | July 22, 1930 |
| 2,759,986 | Morehouse et al. | Aug. 21, 1956 |
| 2,863,933 | Minnich | Dec. 9, 1958 |